United States Patent [19]

Shioda et al.

[11] Patent Number: 5,104,444

[45] Date of Patent: Apr. 14, 1992

[54] ALUMINUM MATRIX BEARING METAL ALLOY

[75] Inventors: Masahiko Shioda; Masashi Arita, both of Yokohama; Katsuji Tanizaki, Yokosuka; Koue Ohdawa; Takeshi Sakai, Chiba, all of Japan

[73] Assignees: Nissan Motor Company, Limited, Yokohama; NDC Co., Ltd., Narishino, both of Japan

[21] Appl. No.: 390,256

[22] Filed: Aug. 7, 1989

[30] Foreign Application Priority Data

Aug. 5, 1988 [JP] Japan .................. 63-195915

[51] Int. Cl.$^5$ .............................. B22F 9/00
[52] U.S. Cl. .................... 75/249; 75/246; 75/248; 419/67; 420/530; 420/532; 420/534; 420/537; 420/546; 420/541; 420/548; 420/550; 428/546
[58] Field of Search ............... 75/230, 249, 246, 247, 75/248; 419/67; 420/530, 532, 534, 548, 537, 541, 554, 550, 536; 428/546

[56] References Cited

U.S. PATENT DOCUMENTS

| | | | |
|---|---|---|---|
| 3,410,331 | 11/1968 | Miller et al. | 420/530 |
| 3,809,551 | 5/1974 | Morisaki | 420/530 |
| 4,278,740 | 7/1981 | Nara et al. | 420/530 |
| 4,412,972 | 11/1983 | Mori | 420/530 |
| 4,617,172 | 10/1986 | Mori | 420/530 |
| 4,732,820 | 3/1988 | Mori | 428/650 |
| 4,806,308 | 2/1989 | Kamiya et al. | 420/530 |
| 4,857,267 | 8/1989 | Maki et al. | 419/31 |

FOREIGN PATENT DOCUMENTS

| | | |
|---|---|---|
| 2469464 | 5/1981 | France . |
| 55-21518 | 2/1980 | Japan . |
| 58-81946 | 5/1983 | Japan . |
| 2117790 | 10/1983 | United Kingdom . |
| 2185041 | 7/1987 | United Kingdom . |

Primary Examiner—Brooks H. Hunt
Assistant Examiner—Ngoclan T. Mai
Attorney, Agent, or Firm—Foley & Lardner

[57] ABSTRACT

An aluminum alloy is prepared from an aluminum alloy powder having a composition of:
lubricating component
  Pb: 3 to 15 Wt %;
hardening component
  Si: 1 to 12 Wt %;
reinforcement component
  one or more selected among Cu, Cr, Mg, Mn, NiZn, Fe and: 0.2 to 5.0 Wt %;
and remainder of aluminum as principal material or matrix.

To the aluminum alloy powder set forth above, powder state Pb in 3 to 12 Wt % is added. With the mixture of the aluminium alloy powder and Pb powder, a billet is formed. For the billet, extrustion process is performed in a extrusion ratio greater than or equal to 40. In the extruded block, Si particle dispersed in the aluminum matrix is in a grain size smaller than or equal to 12 μm. Furthermore, at least of half of added Pb power particle is dispersed to have greater than or equal to 0.74 of circularity coefficient.

2 Claims, 1 Drawing Sheet

ALUMINUM MATRIX BEARING METAL ALLOY

BACKGROUND OF THE INVENTION

1. Field of the Invention

The present invention relates generally to an aluminum type alloy having high seizure resistance, fatigue-resistance and so forth and having light weight. More specifically, the invention relates to an aluminum type alloy suitable for use as bearing metal for producing bearings, sliding member and so forth for automotive vehicles, industrial machines, agricultural machines and so forth.

2. Description of the Background Art

Various bearing metals, such as Cu-Pb type metal alloy, babbitt metal and so forth are selectively used as material for producing slide bearing depending upon use of the bearing. In the automotive industries, attention has been attracted to an aluminum type alloy for a bearing metal for bearings employed in an internal combustion engine, for its high heat-resistance, wear-resistance, corrosion-resistance, fatigue-resistance and so forth. Particularly, Al-Sn type alloys, Al-Sn-Pb type alloys have been considered to have better or more suitable property for use in automotive internal combustion engine.

On the other hand, in the recent days, the automotive internal combustion engines have been required smaller size and lighter weight. To answer such requirement, components of the engine have become smaller. Naturally, an axial length of the bearings are reduced. In contrast to this, the modern type engine have been grown to produce higher power for higher performance. This subjects the bearings in the engine much severe condition. Such severe condition of use of the bearing encounters various problems. Namely, under severe condition of use in the modern and high performance engine, formation of crack, local spolling from backing steel becomes serious problems. Therefore, providing sufficiently high fatigue-resistance becomes important task.

In order to answer this, the owners of the present invention has proposed new type bearing metal in Japanese Patent First (unexamined) Publication (Tokkai) Showa 62-130253. The proposed material is generally composed of Al-Sn-Pb type alloy which is formed into atomized alloy powder. The alloy power is processed through extrusion process. The proposed bearing metal has substantially high fatigue-resistance and high lubricating ability.

The proposed alloy is composed of Al as a matrix or principal component; one or more selected among Pb, Sn, In, Sb, Bi as lubricating component; Si as hardening component; one or more selected among Cu, Cr, Mg, Mn, Ni, Zn, Fe as reinforcement component. The lubricating component is added so that the area ratio versus Al matrix is in a range greater than 0.04 and smaller than or equal to 0.07. The hardening component is added so that the area ratio versus Al matrix is in a range of greater than or equal to 0.01 and smaller than or equal to 0.17. The reinforcement component is added in a content of 0.2 to 5.0 wt %. Further, if desired, one or more selected among Ti, B, Zr, V, Ga, one or more rare earth metal (REM) including Sc and Y can be added in a content of 0.01 to 3.0 Wt % to composite alloy. The lubricating component is prepared in a form of fine grain powder having grain side less than or equal to 8 $\mu$m. The powder state lubricating component is uniformly dispersed in the powder state alloy. The powder state alloy is formed into a billet and processed through extrusion process in an extrusion ratio of greater than or equal to 10. The grain size of Si as hardening component is controlled to be smaller than or equal to 12 $\mu$m, preferably in a range of 6 $\mu$m to 12 $\mu$m. The extrusion processed alloy has tensil stress greater than or equal to 12 Kgf/mm at normal temperature and has expansion under normal temperature is 11% in tensil test.

In such metal alloy, it is preferable to contain large content of Pb as lubricating component for better lubricating ability and higher heat-resistance, higher wear-resistance, higher corrosion-resistance, better oil affinity and so forth. However, when the content of Pb in the alloy exceeds 12 Wt %, Pb grain size becomes excessively large and Pb segregation is caused in the atomized powder processed from the metal at practically used temperature. Furthermore, due to gravitical segregation, fluctuation of Pb concentration can be caused. Excessive grain size of Pb tends to degrade fatigue-resistance of the alloy. Furthermore, due to fluctuation of content of Pb, local degradation of seizure resistance or fatigue-resistance is caused in the alloy. In such reason, the content of Pb is limited to be smaller than or equal to 12 Wt %.

In order to provide Pb content, attempt was made to prepare powder state Pb separately from Al alloy powder. The Pb powder is added to the Al alloy powder before extrusion. However, this attempt was not so successful because when Pb content is excess of 12 Wt % is added, liquid phase Pb molten by the heat in the extrusion process tends to bind Pb particles for forming excessively large size Pb grain in the alloy. Furthermore, presence of such liquid state Pb tends to cause extrusion defect in the extruded block.

DISCLOSURE OF THE INVENTION

In view of the state of art as set forth above, it is an object of the invention to provide an aluminum type alloy which has satisfactorily high fatigue resistance and seizure resistance.

Another object of the invention is to provide aluminum alloy having optimum lubricating component, such as Pb for optimal property of alloy for use as bearing metal.

In order to accomplish aforementioned and other objects, an aluminum alloy, according to the present invention, is prepared from an aluminum alloy powder having composition of:

lubricating component
  Pb: 3 to 15 Wt %;
  Sn: less than or equal to 5 Wt%;
hardening component
  Si: 1 to 12 Wt %;
reinforcement component
  one or more selected among Cu, Cr, Mg, Mn, Ni, Zn, Fe: 0.2 to 5.0 Wt %
and, remainder of aluminum as principal material or matrix;

To the aluminum alloy powder set forth above, powder state Pb in 3 to 12 Wt % is added. With the mixture of the aluminum alloy powder and Pb powder, a billet is formed. For the billet, extrusion process is performed in a extrusion ratio greater than or equal to 40.

In the extruded block, Si particle dispersed in the aluminum matrix is in a grain size smaller than or equal to 12 μm. Furthermore, at least of half of added Pb powder particle is dispersed to have greater than or equal to 0.74 of circularity coefficient which is derived from the following equation based on the sliding surface of the aluminum matrix: circularity coefficient=$4\pi \times$ (surface area of block)/(circumferential length $^2$)

In case that the bearing metal is required substantially high wear-resistance, Pb phase and/or Pb alloy phase having 50 μm of average grain size occupies greater than or equal to 85% of area ratio versus overall Pb phase and/or Pb alloy phase.

As will be appreciated herefrom, the problem of larger content of Pb which has been caused in the prior art can be solved by the present invention by originally providing a limited content of Pb for obtaining uniform distribution of fine particle Pb in the material alloy powder and by adding acceptable amount of Pb, which amount is limited so as not to degrade workability in extrusion process. Furthermore, by appropriately setting extrusion condition, distribution of Pb particle on the sliding surface becomes approximately in circle.

According to one aspect of the invention, a process for producing an aluminum type bearing metal comprises the steps of:
preparing an aluminum alloy powder which has composition of:
lubricating component
  Pb: 3 to 15 Wt %;
  Sn: less than or equal to 5 Wt %;
hardening component
  Si: 1 to 12 Wt %;
reinforcement component
  one or more selected among Cu, Cr, Mg, Mn, Ni, Zn, Fe: 0.2 to 5.0 Wt %
and, remainder of aluminum matrix;
  adding powder state Pb in 3 to 12 Wt %;
  forming the mixture of the aluminum alloy powder and Pb powder into a desired configuration of billet;
  performing extrusion process a extrusion ratio greater than or equal to 40.

Preferably, the extrusion process is so controlled for adjusting growth of Si particle that Si particle dispersed in the aluminum matrix is in a grain size smaller than or equal to 12 μm. Furthermore, the extrusion process may be so controlled that Pb powder particle is dispersed on the sliding surface of the aluminum matrix to have greater than or equal to 0.74 of circularity coefficient. The extrusion process may be so controlled that Pb phase and/or Pb alloy phase having smaller than or equal to 50 μm of average grain size occupies greater than or equal to 85% of area ratio versus overall Pb phase and/or Pb alloy phase.

In the preferred process, the aluminum alloy powder is provided in a form of atomized powder. The atomized aluminum alloy powder is prepared from a metal at a practical melt temperature.

According to another aspect of the invention, an aluminum type bearing metal composed of:
  a lubricating component including Pb;
  a hardening component including Si;
  a reinforcement component including one or more selected among Cu, Cr, Mg, Mn, Ni, Zn, Fe; and
  and aluminum as matrix,
  Si particle being dispersed in the aluminum matrix in a grain size smaller than or equal to 12 μm; and
  Pb being distributed on the surface of the aluminum matrix so as to achieve greater than or equal to 0.74 of circularity coefficient when formed into a bearing.

Preferably, the Pb is distributed in a form of Pb phase and/or Pb alloy phase, and the Pb phase and/or Pb alloy phase having smaller than or equal to 50 μm of average grain size occupies greater than or equal to 85% of area ratio versus overall Pb phase and/or Pb alloy phase. The lubricating component may further include Sn.

In the preferred composition, the an atomized aluminum alloy powder is composed of:
  Pb: 3 to 15 Wt %
  Sn: less than or equal to 5 Wt %
  Si: 1 to 12 Wt %
  one or more selected among Cu, Cr, Mg, Mn, Ni, Zn, Fe: 0.2 to 5.0 Wt %,
to which aluminum alloy powder, separately prepared Pb powder is added in amount of 3 to 12 Wt %.

According to a further aspect of the invention, an aluminum alloy bearing formed of an aluminum type bearing metal which composed of:
  a lubricating component including Pb;
  a hardening component including Si;
  a reinforcement component including one or more selected among Cu, Cr, Mg,
  Mn, Ni, Fe; and and aluminum as matrix,
  Si particle being dispersed in the aluminum matrix in a grain size smaller than or equal to 12 μm; and
  Pb being distributed on the surface of the aluminum matrix so as to achieve greater than or equal to 0.74 of circularity coefficient on a bearing surface mating with a rotary body supported thereon.

Further detail about present invention will be discussed herebelow for facilitating better understanding of the invention. However, the present invention will be understood more fully from the detailed description given herebelow and from the examples given herebelow, the invention should not be taken to limit the invention to the specific examples but are for explanation and understanding only.

BRIEF DESCRIPTION OF THE DRAWINGS

In the drawings:
Sole drawing shows explanatory drawing showing load pattern in wearing test.

DETAILED DESCRIPTION OF THE INVENTION

Figure 1:
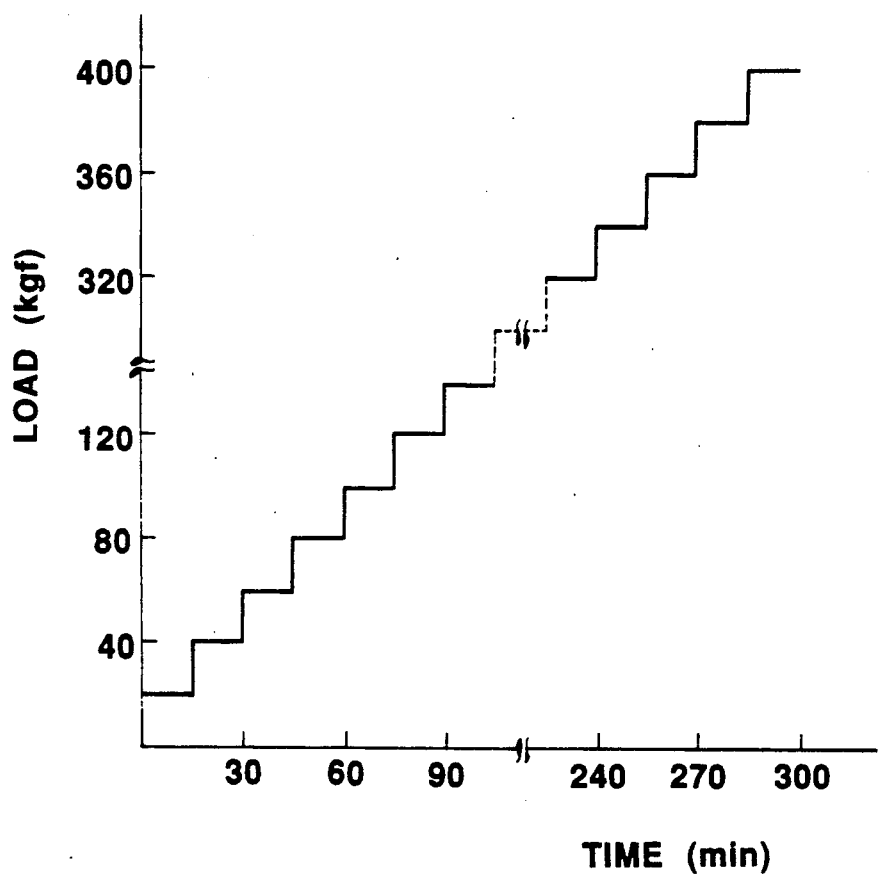

The present invention will now be discussed in detail with reference to some examples derived from experiments. At first, discussion will be made for composition of an aluminum alloy which will be hereafter referred to as "material Al alloy" as a base or principal material for producing a bearing metal according to the present invention.

(1) Lubricating Component

In the present invention, material Al alloy contains a limited amount of lubricating component for providing high seizure resistance, fatigue resistance and so forth. Among various material to be used as lubricating component, the present invention selects Pb and Sn as preferred materials. Both of these materials are known as appropriate materials for providing lubricating ability. Furthermore, in comparison with Sn, Pb has better property in view point of seizure resistance ability.

When Pb content is less than 3 Wt %, seizure resistance ability becomes unacceptably low. In addition, at such low content of Pb, ability of burying foreign matter becomes acceptably lowered. On the other hand, when the content of Pb becomes in excess of 15 Wt %, fatigue-resistance of the matrix becomes lowered. Therefore, in either case, the material cannot be regarded suitable as bearing metal for insufficient withstanding load. In addition, when the content of Pb becomes greater than 12 Wt %, grain size of Pb particle in Pb phase in atomized powder which is produced from practical temperature range of melt, becomes excessively large. Furthermore, the Pb content greater than 12 Wt % may cause segregation of Pb in the matrix. Such excessive grain size of Pb particle or segregation cause in the matrix influences to property of extruded block even when extrusion rate is rather large. Therefore, preferred content of Pb is less than or equal to 12 Wt %.

On the other hand, Sn is effective for improving corrosion-resistance of Pb. However, if the content of Sn is greater than 5 Wt %, fatigue-resistance becomes insufficient. Furthermore, Sn in excess of 5 Wt % may become liquid phase by heat during extrusion process to form defect in the extruded block. In view of this, the content of Sn is limited less than or equal to 5 Wt %.

(2) Hardening Component

In the shown invention, Si is used as hardening material for the material Al alloy. Si is thus added in a form of eutectic crystal Si or pre-eutetic crystal Si. Si is thus added for improving mechanical strength of the bearing metal and wear-resistance. When the content of Si is smaller than 1 Wt %, remarkable effect of Si cannot be obtained. On the other hand, when the content of Si is greater than 12 Wt %, toughness of is reduced for degrading workability.

Grain size of Si particle is preferred to be less than or equal to 12 $\mu$m. When the grain size of Si particle becomes greater than 12 $\mu$m, such great grain size Si particle tends to damage other materials in the extruded block. Furthermore, Si particle having grain size greater than 12 $\mu$m tends to cause insufficient area density to cause degradation of wear-resistance. Therefore, Si content is limited to be smaller than or equal to 12 $\mu$m.

It is also possible to add Si in a form of atomized Si powder containing Al in a content of 8 Wt % to 30 Wt %.

(3) Reinforcement Component

Material Al alloy further contains reinforcement component for improving strength of the alloy. In the present invention, the reinforcement component is composed of one or more materials selected among Cu, Cr, Mg, Mn, Ni, Zn and Fe. Such reinforcement component is preferred to be contained in a range of 0.2 Wt % to 5.0 Wt %.

Amongst the material set out above, Cu is considered good material for high creep strength. Therefore, Cu may provide high fatigue-resistance at high temperature sliding. If the content of Cu is less than 0.2 Wt %, noticeable improvement in creep strength cannot be expected. On the other hand, if the content of Cu is greater than 5.0 Wt %, large amount of needle form CuAl is precipitated to cause degradation of toughness. This causes lowering of fatigue-resistance. Cr, Mg, Mn, Ni, Zn and Fe have equivalent property to that of Cu and often used as additive for providing malleability of Al alloy. Therefore, one or two of these materials are added as reinforcement component in a range of 0.2 Wt % to 5.0 Wt %.

(4) Material for Fine Crystallization of Alloy

If desired, in addition to the foregoing components, material which aids for fine crystallization of material Al alloy, can be added. In the present invention, such material is selected among Ti, B, Zr, V, Ga, REM (including Y and Sc). The material is added in amount of 0.01 Wt % to 3.0 Wt %. Such material is particularly effective in promoting fine graining of particle of lubricating component.

Aforementioned components (1) through (4) are added to Al matrix and processed for preparing atomized Al powder. According to the present invention, Pb powder prepared separately from the material Al powder set forth above, is added before performing extrusion process. Composition of the Pb powder will be discussed herebelow:

(5) Pb in the Pb powder

Pb in the Pb powder serves as lubrication for providing anti-seizure property for Al alloy as the bearing metal. If the amount of Pb to be added is less than 3 Wt%, noticeable lubricating effect cannot be obtained. On the other hand, if the amount of Pb to be added is greater than 12 Wt%, the added Pb powder is at least partly molten to degrade extrusion ability. Furthermore, grain size becomes excessively greater by coupling Pb particles to each other.

During extrusion process, Pb particle is crushed into smaller grain size. However, in order to obtain fine grain of Pb as equivalent to that in the material Al powder, it is preferably to use Pb of grain size smaller than or equal to 300 mesh.

According to the present invention, distribution of Pb phase and Pb alloy phase in the extruded block is so controlled as to have sufficiently high circularity. In case that distribution of Pb phase or Pb alloy phase in the extruded block is in a form of an ellipsoid or strip, uniformity of distribution of Pb cannot be obtained to cause seizure when local contact between bearing metal and a shaft to be supported thereon is caused at the portion where Pb phase or Pb alloy phase is absent. Furthermore, such non-uniform distribution of Pb can lower strength versus load applied in a direction perpendicular to the Pb or Pb alloy phase to lower fatigue resistance. In addition fluctuation of distribution of Pb causes fluctuation of performance of respective independent extruded blocks.

The inventors have found that when Pb particles as added in a form of the Pb powder is distributed on the sliding surface in a form having 0.74 of circularity coefficient which is derived from:

circularity coefficient $= 4\pi \times$ (surface area of block)/(circumferential length 2)

satisfactory anti-seizure property and fatigue-resistance of the bearing metal can be obtained.

On the other hand, when the Pb or Pb alloy phase has too large size, it still possible to degrade fatigue-resistance. Therefore, when particularly high fatigue-resistance is required, average grain size of Pb and/or Pb alloy phase is better to be limited to be smaller than or equal to 50 $\mu$m. Practically, in order to obtain particularly high fatigue-resistance, it becomes necessary to provide area ratio of Pb and/or Pb alloy phase having average grain size smaller than or equal to 50 μm versus overall Pb and/or Pb alloy phase, greater than or equal to 85%.

In order to perform extrusion process, the Pb powder is added to the material Al powder. With the mixture of the Pb powder and the material Al powder, a billet is formed. The billet is then subject extrusion process in an extrusion ratio of 40. When the extrusion ratio is less than 40, satisfactorily high circularity of distribution of Pb or Pb alloy phase cannot be obtained. Furthermore, when extrusion is performed at the extrusion ratio less than 40, extrusion defects, such as internal crack or surface crack can be formed.

In addition, in order to avoid formation of extrusion defect, it is preferably to perform extrusion at a temperature lower than or equal to 450° C.

EXAMPLES

In order to demonstrate the property of the Al type bearing metal produced according to the present invention, discussion will be made with respect to examples together with comparative examples, herebelow. The compositions of the examples and comparative examples are shown in the appended table I.

Initially, respective sample materials No. 1 through No. 23 are subject air-atomizing process for obtaining material Al alloy powder. In the atomizing process, melts at a temperature of 1100° C. is prepared. For respective melts of samples No. 1 through No. 23 is then subject to air-atomization process. In atomized Al powder produced by the sample No. 18, large number of segregated powder containing Pb and Sn as principal components was observed.

For atomized powders of respective samples, Pb powder having composition as shown in the table I is added and mixed. The mixtures are formed into cylindrical billets having diameter of 200 mm, axial length of 150 mm. Billets were formed by green compacting at a pressure of 2.0 tonf/cm². The billets were wrapped by pure aluminum plate and then subject extrusion process into a plate form extruded body having thickness of 3 mm and width of 105 mm. During extrusion,the samples Nos. 20 and 21 were heated at 470° C. and remaining samples are heated at 400° C.

Because of excess amount of Pb in the material Al alloy of sample No. 18, excess Pb content in Pb powder of sample No. 14, and excess amount of Sn in the material Al alloy of sample No. 16, defects, such as surface crack or end crack, were observed. Therefore, the extruded blocks of these samples were not suitable for practical use.

Sample No. 24 was prepared in the composition of:
Si: 4 Wt %
Cu: 1.00 Wt %
remainder amount of Al having particle size of 150 mesh.

The material Al powder was mixed with Pb powder containing 30 Wt % of Sn. The material Al powder and Pb powder were mixed in a ratio of 84:16. With the mixture, billet was formed by green compacting at a pressure 2.0 tonf/cm². The billet has the same dimension as that of other samples. The billet was wrapped by pure aluminium plate and subject extrusion for forming 25 mm-thick and 100 mm-width extruded body. Extrusion was performed at a process temperature of 280° C.

Friction Test

The sample alloys Nos. 1 through 12 of the examples and Nos. 13, 15, 17, 19 through 24 of the comparative examples, which could formed into extruded bodies without causing defect, were subject several stages of rolling to form thin strips. From each strips, sample strips of 35 m-width, 35 mm-length and 1.5 mm-thickness was obtained. For sample alloy No. 24, intermediate annealing at 300° C. for 5 hours was performed at thickness of 10 mm and 4 mm during rolling process. Furthermore, final annealing at temperature of 350° C. for 5 hours was also performed before cutting the sample strip. For other sample alloys, only final annealing at the same condition.

Alloy No. 15 caused cracking during rolling process and could not be rolled at the target temperature.

For the sample strips, friction test in a condition as shown in the appended table II and shown in the drawing was performed. The results of the friction test are shown in the appended table III. As can be clear from table III, the examples No. 1 through 12 of the present invention had far better surface surface property than that of the comparative examples No. 13, 17, 19 through 24.

Bearing Fatigue-Resistance Test

For sample alloys of Nos. 1 through 12 of example and Nos. 13, 17, 19 through 24, with which healthy extruded blocks and rolled strips could be obtained, were subject rolling process with steel strip of 1.7 mm-thickness, at a reduction of 48%. Subsequently, final annealing at a temperature of 350° C. for 10 hours was performed. After annealing, each samples are machined to form bearings. For the bearings of respective samples, bearing fatigue-resistance test was performed under the severe condition as shown in table IV. Results of the bearing fatigue-resistance test are shown in the appended table V.

As can be seen from the table V, the examples No. 1 through No. 12 according to the present invention, lowering of fatigue-resistance was not observed despite of increased amount of Pb and whereby improving of anti-burning or anti-seizing property. In contrast to this, comparative examples Nos. 20, 21 and 24 causes crack in a short period and this appreciated that these have insufficient fatigue-resistance.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

TABLE I

| Sample No. | Atomized Al Powder Alloy Composition (Wt %) | | | | | | | | | | | Pb Powder Grain Size (mesh) | Pb Powder Mixture Ratio (Wt %) |
| --- | --- | --- | --- | --- | --- | --- | --- | --- | --- | --- | --- | --- | --- |
| | Al | Pb | Sn | Si | Cu | Cr | Mg | Mn | Ni | Zr | Fe | | |
| Exam. 1 | Rem. | 3 | 3 | 8 | 0.05 | — | 0.5 | — | — | 4 | — | −300 | 6 |
| Exam. 2 | Rem. | 3 | 5 | 12 | — | 0.2 | — | — | — | — | — | −300 | 9 |

TABLE I-continued

| | | | | | | | | | | | | | |
|---|---|---|---|---|---|---|---|---|---|---|---|---|---|
| Exam. 3 | Rem. | 6 | 3 | 4 | 0.05 | — | — | 0.4 | 1.0 | — | — | −300 | 12 |
| Exam. 4 | Rem. | 6 | 3 | 6 | — | 0.2 | — | 0.4 | — | — | — | −300 | 6 |
| Exam. 5 | Rem. | 9 | — | 4 | — | 0.5 | — | — | 0.5 | — | — | −300 | 9 |
| Exam. 6 | Rem. | 9 | 3 | 1 | 0.75 | — | — | 0.4 | — | — | — | −300 | 6 |
| Exam. 7 | Rem. | 9 | 3 | 6 | 0.75 | — | — | — | — | — | — | −300 | 6 |
| Exam. 8 | Rem. | 12 | — | 4 | — | — | 0.5 | 0.4 | — | 3.5 | — | −300 | 6 |
| Exam. 9 | Rem. | 12 | 3 | 4 | 0.75 | 0.5 | — | — | — | — | — | −300 | 6 |
| Exam. 10 | Rem. | 12 | 3 | 2 | 0.50 | — | — | 0.4 | — | — | — | −300 | 3 |
| Exam. 11 | Rem. | 12 | 5 | 4 | — | 0.2 | — | — | — | — | 2.0 | −300 | 3 |
| Exam. 12 | Rem. | 15 | 3 | 4 | 0.75 | — | — | — | 0.5 | — | — | −300 | 6 |
| Comp. 13 | Rem. | — | 6 | 8 | 0.75 | 0.5 | — | — | — | — | — | −300 | 9 |
| Comp. 14 | Rem. | 3 | 3 | 4 | 0.75 | 0.5 | — | — | — | — | — | −300 | 15 |
| Comp. 15 | Rem. | 6 | 3 | 16 | 0.75 | — | — | 0.4 | — | — | — | −300 | 6 |
| Comp. 16 | Rem. | 9 | 7 | 4 | 0.75 | 0.5 | — | — | — | — | — | −300 | 6 |
| Comp. 17 | Rem. | 12 | 5 | — | 0.75 | — | — | 0.4 | — | — | — | −300 | 6 |
| Comp. 18 | Rem. | 18 | 5 | 4 | 0.75 | 0.5 | — | — | — | — | — | −300 | 6 |
| Comp. 19 | Rem. | 9 | 3 | 4 | 0.75 | — | — | 0.4 | — | — | — | — | — |
| Comp. 20 | Rem. | 9 | 3 | 1 | 0.75 | — | — | 0.4 | — | — | — | −300 | 6 |
| Comp. 21 | Rem. | 12 | 3 | 4 | 0.75 | 0.5 | — | — | — | — | — | −300 | 6 |
| Comp. 22 | Rem. | 9 | 3 | 1 | 0.75 | — | — | 0.4 | — | — | — | −100 | 6 |
| Comp. 23 | Rem. | 12 | 3 | 4 | 0.75 | 0.5 | — | — | — | — | — | −100 | 6 |
| Comp. 24 | Rem. | — | — | 4 | 1.00 | — | — | — | — | — | — | −300 | 16 (Pb—30 Sn) |

| Sample No. | Extrusion Temp. (°C) | Extrusion Ratio | Si Particle Grain Size (μm) | Ratio of Pb Phase having Circularity Coefficient ≥0.74 | Area Ratio of Pb and/or Pb alloy Phase having Average Grain Size ≤50 μm | Remarks |
|---|---|---|---|---|---|---|
| Exam. 1 | 400 | 97.73 | ≤12 | 65.1 | 100 | |
| Exam. 2 | 400 | 97.73 | ≤12 | 71.1 | 89 | |
| Exam. 3 | 400 | 97.73 | ≤12 | 76.1 | 91 | |
| Exam. 4 | 400 | 97.73 | ≤12 | 69.0 | 100 | |
| Exam. 5 | 400 | 97.73 | ≤12 | 70.8 | 93 | |
| Exam. 6 | 400 | 97.73 | ≤12 | 67.0 | 100 | |
| Exam. 7 | 400 | 97.73 | ≤12 | 69.2 | 100 | |
| Exam. 8 | 400 | 97.73 | ≤12 | 67.2 | 95 | |
| Exam. 9 | 400 | 97.73 | ≤12 | 69.9 | 100 | |
| Exam. 10 | 400 | 97.73 | ≤12 | 64.9 | 95 | |
| Exam. 11 | 400 | 97.73 | ≤12 | 58.6 | 88 | |
| Exam. 12 | 400 | 97.73 | ≤12 | 65.6 | 87 | |
| Comp. 13 | 400 | 97.73 | ≤12 | 78.1 | 86 | |
| Comp. 14 | 400 | 97.73 | — | — | — | Extrusion Defect |
| Comp. 15 | 400 | 97.73 | — | — | — | Rolling Crack |
| Comp. 16 | 400 | 97.73 | — | — | — | Extrusion Defect |
| Comp. 17 | 400 | 97.73 | ≤12 | 67.4 | 66 | |
| Comp. 18 | 400 | 97.73 | — | — | — | Extrusion Defect |
| Comp. 19 | 400 | 97.73 | ≤12 | — | 100 | |
| Comp. 20 | 400 | 97.73 | ≤12 | 36.3 | 62 | |
| Comp. 21 | 400 | 97.73 | ≤12 | 32.8 | 54 | |
| Comp. 22 | 400 | 97.73 | ≤12 | 44.8 | 52 | |
| Comp. 23 | 400 | 97.73 | ≤12 | 46.2 | 48 | |
| Comp. 24 | 380 | 12.50 | ≤12 | (42.9) | 82 | |

TABLE II

| Condition of Friction Test | |
|---|---|
| Dimension of Sample (mm) (L × W × T) | 35 × 35 × 1.5 |
| Peripheral Velocity (m/sec) | 4.0 |
| Kind of Fluid | SAE 7.5 W-30 |
| Fluid Temperature (°C) | 130 |
| Material of Shaft | S45C |
| Shaft Roughness (Rmax μm) | 0.8 |
| Shaft Hardness ($H_RC$) | Approximately 55 |
| Load Pattern (FIG. 1) | 20 Kgf~400 Kgf (or until Seizure) 20 Kgf/15 min (Stepwise increase) |
| Condition of Detection of Seizure | Material Temp. ≥ 220° C. or Ffriction Coefficient ≥ 0.3 |

TABLE III

| | Results of Friction Test | |
|---|---|---|
| No. | Example | Buring Load (Kgf) |
| 1 | Invention | 280 |
| 2 | | No Seizure |
| 3 | | 360 |
| 4 | | 320 |
| 5 | | 300 |
| 6 | | 320 |
| 7 | | 360 |
| 8 | | 360 |
| 9 | | 320 |
| 10 | | 340 |
| 11 | | 320 |
| 12 | | No Seizure |
| 13 | Comparative | 260 |
| 17 | | 280 |
| 19 | | 180 |
| 20 | | 200 |
| 21 | | 220 |
| 22 | | 160 |
| 23 | | 160 |
| 24 | | 200 |

TABLE IV

| Condition of Fatigue Test | |
|---|---|
| Dimension of Bearing (mm) (Dia. × W × T) | φ53 × 11.3 × 1.5 |

TABLE IV-continued

Condition of Fatigue Test

| | |
|---|---|
| Rotation Speed (r.p.m.) | 3500 |
| Kind of Fluid | SAE 20 W-40 |
| Supply Fluid Temperature (°C.) | 130 |
| Supply Fluid Pressure (Kgf/cm$^2$) | 4.0 |
| Material of Shaft | S45C |
| Shaft Roughness (Rmax μm) | 0.8 |
| Shaft Hardness (H$_R$C) | ≈55 |
| Test Time (Hrs.) | 200 (or until cracking) |

TABLE V

Results of Fatigue Test

| No. | Example | Time |
|---|---|---|
| 1 | Invention | Not Fatigued |
| 2 | | 140 |
| 3 | | 180 |
| 4 | | 160 |
| 5 | | Not Fatigued |
| 6 | | 180 |
| 7 | | 140 |
| 8 | | 180 |
| 9 | | 160 |
| 10 | | 140 |
| 11 | | 160 |
| 12 | | 140 |
| 13 | Comparative | 180 |
| 17 | | 140 |
| 19 | | Not Fatigued |
| 20 | | 120 |
| 21 | | 100 |
| 22 | | 100 |
| 23 | | 100 |
| 24 | | 80 |

What is claimed is:

1. An aluminum type bearing metal comprising:
   a matrix comprising aluminum;
   a lubricating component comprising Pb and Sn;
   a hardening component comprising Si;
   a reinforcement component comprising one or more constituent selected from the group consisting of Cu, Cr, Mg, Mn, Zn, and Fe;
   said Si being dispersed in the aluminum matrix in a grain size smaller than or equal to 12 μm; and
   said Pb being distributed on the surface of the aluminum matrix so as to achieve greater than or equal to 0.74 of circularity coefficient when formed into a bearing;
   wherein said metal is made from an atomized aluminum alloy powder comprising:
   3 to 15 weight % Pb;
   less than or equal to 5 weight % Sn;
   1 to 12 weight % Si;
   0.2 to 5.0 weight % of one or more components selected from the group consisting of Cu, Cr, Mg, Mn, Ni, Zn, and Fe; and the remainder being Al;
   wherein 3 to 12 weight % of separately prepared Pb powder is added to said aluminum alloy powder.

2. An aluminum type bearing metal as set forth in claim 1, wherein said Pb is distributed in a form of Pb phase and/or Pb alloy phase such that at least about 85% of the area occupied by said Pb phase and/or Pb alloy phase contains Pb or Pb alloy having an average grain size of smaller than or equal to about 50 μm.

* * * * *